(12) United States Patent
Ikeshita et al.

(10) Patent No.: US 12,512,502 B2
(45) Date of Patent: *Dec. 30, 2025

(54) METHOD OF MANUFACTURING BATTERY

(71) Applicant: Prime Planet Energy & Solutions, Inc., Tokyo (JP)

(72) Inventors: Kazuya Ikeshita, Minamiawaji (JP); Yoshiyuki Furukoji, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 579 days.

This patent is subject to a terminal disclaimer.

(21) Appl. No.: 17/882,601

(22) Filed: Aug. 8, 2022

(65) Prior Publication Data
US 2023/0048342 A1 Feb. 16, 2023

(30) Foreign Application Priority Data

Aug. 11, 2021 (JP) ................... 2021-131369

(51) Int. Cl.
| | |
|---|---|
| *H01M 10/04* | (2006.01) |
| *H01M 10/0585* | (2010.01) |
| *H01M 10/0587* | (2010.01) |
| *H01M 50/406* | (2021.01) |
| *H01M 50/469* | (2021.01) |

(52) U.S. Cl.
CPC ... *H01M 10/0409* (2013.01); *H01M 10/0585* (2013.01); *H01M 10/0587* (2013.01); *H01M 50/406* (2021.01); *H01M 50/469* (2021.01)

(58) Field of Classification Search
None
See application file for complete search history.

(56) References Cited

U.S. PATENT DOCUMENTS

| | | |
|---|---|---|
| 2011/0289766 A1 | 12/2011 | Kim et al. |
| 2014/0302367 A1 | 10/2014 | Ueno et al. |
| 2016/0260552 A1 | 9/2016 | Sato et al. |

FOREIGN PATENT DOCUMENTS

| | | |
|---|---|---|
| JP | 2006216520 A | 8/2006 |
| JP | 2009193750 A | 8/2009 |

(Continued)

OTHER PUBLICATIONS

Office Action in U.S. Appl. No. 17/882,602 mailed May 1, 2025; 12 pp.

(Continued)

*Primary Examiner* — Jeffrey T Barton
*Assistant Examiner* — Karen J. Armstrong
(74) *Attorney, Agent, or Firm* — HAUPTMAN HAM, LLP

(57) ABSTRACT

(A): Winding a first separator, a second separator, a positive electrode plate, and a negative electrode plate onto a winding core disposed at a first position. (B): Moving the winding core away from the first position and disposing another winding core at the first position. (C): Cutting the first separator and the second separator wound on the winding core that is moved away from the first position in (B) at a location on or near the other winding core disposed at the first position in (B), with the first separator and the second separator being stacked and retained on an outer circumferential surface of the other winding core. (D): Winding the first separator and the second separator onto the winding core that is moved away from the first position in (B) up to a cut edge portion at which the first separator and the second separator are cut in (C).

12 Claims, 7 Drawing Sheets

(56) References Cited

FOREIGN PATENT DOCUMENTS

| | | |
|---|---|---|
| JP | 2011-116525 A | 6/2011 |
| JP | 2011253701 A | 12/2011 |
| JP | 2014-154457 A | 8/2014 |
| JP | 2014-222595 A | 11/2014 |
| JP | 2016136506 A | 7/2016 |
| JP | 2021-020700 A | 2/2021 |
| KR | 10-2013-0025957 A | 3/2013 |
| WO | 2012020658 A1 | 2/2012 |
| WO | 2013/065535 A1 | 5/2013 |

OTHER PUBLICATIONS

Office Action in U.S. Appl. No. 17/882,602 mailed Sep. 11, 2025, 15pp.

METHOD OF MANUFACTURING BATTERY

CROSS REFERENCE TO RELATED APPLICATIONS

The present application claims priority from Japanese Patent Application No. 2021-131369 filed on Aug. 11, 2021, which is incorporated by reference herein in its entirety.

BACKGROUND

The present invention relates to a method of manufacturing a battery.

JP 2009-193750 A discloses a method of manufacturing an electrode plate group for a non-aqueous electrolyte secondary battery in which a strip-shaped positive electrode plate and a strip-shaped negative electrode plate are spirally wound with two sheets of separator being stacked together alternately. In the manufacturing method disclosed in the publication, tip parts of the separators are stuck to a winding core while being pressed against the winding core, and the positive electrode plate and the negative electrode plate are sandwiched and wound into a spiral shape.

JP 2011-253701 A discloses a wound element manufacturing apparatus. The manufacturing apparatus disclosed in the publication is provided with a winding core for winding up both electrode foils and both separators on a disk-shaped turret that is rotatable about its central axis as the rotational axis. A plurality of the winding cores are provided intermittently along the rotational direction of the turret.

SUMMARY

The present inventors believe that it is desirable to improve productivity of such a method of manufacturing a battery including a wound electrode assembly.

The present disclosure discloses a method of manufacturing a battery including a wound electrode assembly, the method including the following steps.
- Step (A): Winding a first separator, a second separator, a positive electrode plate, and a negative electrode plate onto a winding core disposed at a first position.
- Step (B): Moving the winding core away from the first position and disposing another winding core at the first position.
- Step (C): Cutting the first separator and the second separator wound on the winding core that is moved away from the first position in step (B) at a location on or near the other winding core disposed at the first position in step (B), with the first separator and the second separator being stacked and retained on an outer circumferential surface of the other winding core.
- Step (D): Winding the first separator and the second separator onto the winding core that is moved away from the first position in step (B) up to a cut edge portion at which the first separator and the second separator are cut in step (C).

The above-described embodiment of the method of manufacturing a battery makes it possible to improve productivity in manufacture of the wound electrode assembly.

In step (C), it is possible that the first separator and the second separator may be cut, with the first separator and the second separator being wound on a circumferential region of 15 degrees to 180 degrees of the other winding core disposed at the first position in step (B). Also, in step (C), the first separator may be cut, with the first separator being in contact with the other winding core in an upstream side and a downstream side of a cut position at which the first separator is cut in a transfer path of the first separator. Also, in step (C), when the first separator and the second separator are cut, the first separator may be suction-attached to the other winding core.

In step (C), when the first separator and the second separator are cut, the first separator and the second separator may be pressed onto the other winding core by a presser jig. The presser jig may be a roller including a plurality of protrusions formed on its outer circumferential surface.

It is also possible that the outer circumferential surface of the other winding core disposed at the first position in step (B) may include a groove formed along an axial direction of the other winding core corresponding to a position at which the first separator and the second separator are cut. It is also possible that in step (C), the first separator and the second separator may be cut by a blade being movable toward the other winding core disposed at the first position in step (B). It is also possible that the winding core moved away from the first position in step (B) may be disposed at a second position in step (D) and thereafter moves to a third position being different from the first position and the second position, and the method may further include the step of removing, at the third position, a wound stack in which the first separator, the second separator, the positive electrode plate, and the negative electrode plate are wound together from the winding core that is moved away from the first position in step (B).

DETAILED DESCRIPTION

Embodiments of the invention according to the present disclosure will be described hereinbelow. It should be noted, however, that the disclosed embodiments are, of course, not intended to limit the invention. The present invention is not limited to the embodiments described herein unless specifically stated otherwise. The drawings are depicted schematically and do not necessarily accurately depict actual objects. The features and components that exhibit the same effects are designated by the same reference symbols as appropriate, and the description thereof will not be repeated.

Figure 1:
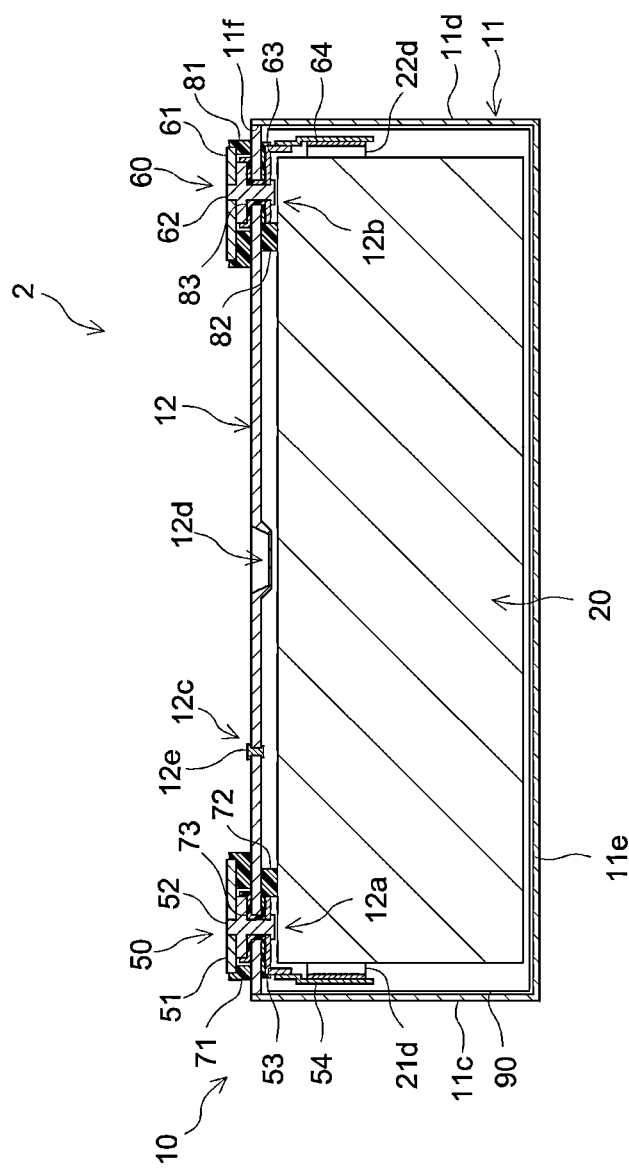
FIG. 1 is a vertical sectional view of a battery 2.

FIG. 1 is a vertical sectional view of a battery 2. FIG. 1 schematically shows the battery 2 from which the front-side wider surface of a battery case 10 is virtually removed so that the inside of the battery case 10 can be seen. The battery 2 is one embodiment of the battery produced by the manufacturing method disclosed herein. The battery 2 includes a wound electrode assembly 20 accommodated in a battery case 10. It should be noted that the embodiments of the battery manufactured by the method disclosed herein are not limited to the one shown in FIG. 1.

Battery 2

The battery 2 shown in FIG. 1 is a horizontally elongated prismatic battery. As illustrated in FIG. 1, the battery 2 includes the battery case 10, the wound electrode assembly 20, a positive electrode terminal 50, and a negative electrode terminal 60. The battery case 10 includes an outer container 11 and a sealing plate 12.

Outer Container 11

The outer container 11 is a closed-bottom prismatic case having a horizontally elongated rectangular-shaped enclosing space. The outer container 11 mainly encloses the wound electrode assembly 20. The outer container 11 includes a substantially rectangular-shaped bottom surface 11e, a pair of opposing wider surfaces 11a and 11b (not shown) provided along the longer sides of the bottom surface 11e, and a pair of opposing narrower surfaces 11c and 11d provided along the shorter sides of the bottom surface 11e. An open end 11f is formed facing the bottom surface 11e to accommodate the wound electrode assembly 20. The sealing plate 12 is attached to the open end 11f.

Sealing Plate 12

The sealing plate 12 is fitted to the open end 11f of the battery case 10. The sealing plate 12 is composed of a substantially rectangular-shaped plate material that can be fitted to the open end 11f of the outer container 11. The sealing plate 12 is a substantially rectangular-shaped plate material. In the sealing plate 12, a mounting hole 12a for mounting a positive electrode terminal 50 is formed near one longitudinal end thereof, and a mounting hole 12b for mounting a negative electrode terminal 60 is formed near the opposite end.

A filling port 12c and a gas vent valve 12d are provided at a central portion of the sealing plate 12. The filling port 12c is a through hole provided for filling a non-aqueous electrolyte solution into the interior of the battery case 10 that has been hermetically sealed. After filling the non-aqueous electrolyte solution, the filling port 12c is sealed with a sealing member 12e fitted therein. The gas vent valve 12d is a thinned portion that is designed to rupture (i.e., to open) when a large amount of gas is generated inside the battery case 10, so as to expel the gas.

For the non-aqueous electrolyte solution, it is possible to use any non-aqueous electrolyte solution used for conventionally known secondary batteries without any particular limitation. For example, the non-aqueous electrolyte solution may be prepared by dissolving a supporting salt into a non-aqueous solvent. Examples of the non-aqueous solvent include carbonate-based solvents, such as ethylene carbonate, dimethyl carbonate, and ethyl methyl carbonate. Examples of the supporting salt include fluorine-containing lithium salts, such as $LiPF_6$.

Positive Electrode Terminal 50 and Negative Electrode Terminal 60

The positive electrode terminal 50 and the negative electrode terminal 60 are attached to the sealing plate 12. The wound electrode assembly 20 is enclosed in the outer container 11, with the wound electrode assembly 20 being attached to the positive electrode terminal 50 and the negative electrode terminal 60. The positive electrode terminal 50 includes an external terminal 51, a shaft member 52, an internal terminal 53, a current collecting member 54, a first insulator 71, a second insulator 72, and a gasket 73. The negative electrode terminal 60 includes an external terminal 61, a shaft member 62, an internal terminal 63, a current collecting member 64, a first insulator 81, a second insulator 82, and a gasket 83. The first insulators 71, 81, the second insulators 72, 82, and the gaskets 73, 83 are each composed of an insulating material. The first insulators 71, 81 and the second insulators 72, 82 are each composed of a resin having required rigidity. The gaskets 73 and 83 are members that are fitted respectively to the mounting holes 12a and 12b of the sealing plate 12 and each have required flexibility.

The respective shaft members 52 and 62 of the positive electrode terminal 50 and the negative electrode terminal 60 are fitted to the mounting holes 12a and 12b of the sealing plate 12 with the respective gaskets 73 and 83 interposed therebetween. The external terminals 51 and 61 are attached to the outside of the sealing plate 12 with the first insulators 71 and 81 interposed therebetween. Each of the external terminals 51 and 61 includes a mounting hole, and is fitted to the outer end of each of the shaft members 52 and 62. The internal terminals 53 and 63 are attached to the inside of the sealing plate 12 with the second insulators 72 and 82 interposed therebetween. Each of the internal terminals 53 and 63 includes a mounting hole, and is fitted to the inner end of each of the shaft members 52 and 62. The inner end of each of the shaft members 52 and 62 is press-fitted to the circumference of the mounting hole of each of the internal terminals 53 and 63. Each of the current collecting members 54 and 64 is attached to one end of each of the internal terminals 53 and 63.

Thus, the positive electrode terminal 50 and the negative electrode terminal 60 are attached to the sealing plate 12, with the positive electrode terminal 50 and the negative electrode terminal 60 being electrically insulated by the first insulators 71, 81, the second insulators 72, 82, and the interposed gaskets 73, 83, and with hermeticity being ensured. Also, an electrically conductive path is formed by the external terminals 51, 61, the shaft members 52, 62, the internal terminals 53, 63, and the current collecting members 54, 64. The wound electrode assembly 20 is fitted to the current collecting members 54 and 64. With the wound electrode assembly 20 being attached to the sealing plate 12 in this way, the wound electrode assembly 20 is enclosed in the outer container 11. It is also possible that a plurality of wound electrode assemblies 20 may be attached to one sealing plate 12. It is also possible that a plurality of wound electrode assemblies 20 may be accommodated in one battery case 10.

Wound Electrode Assembly 20

Figure 2:
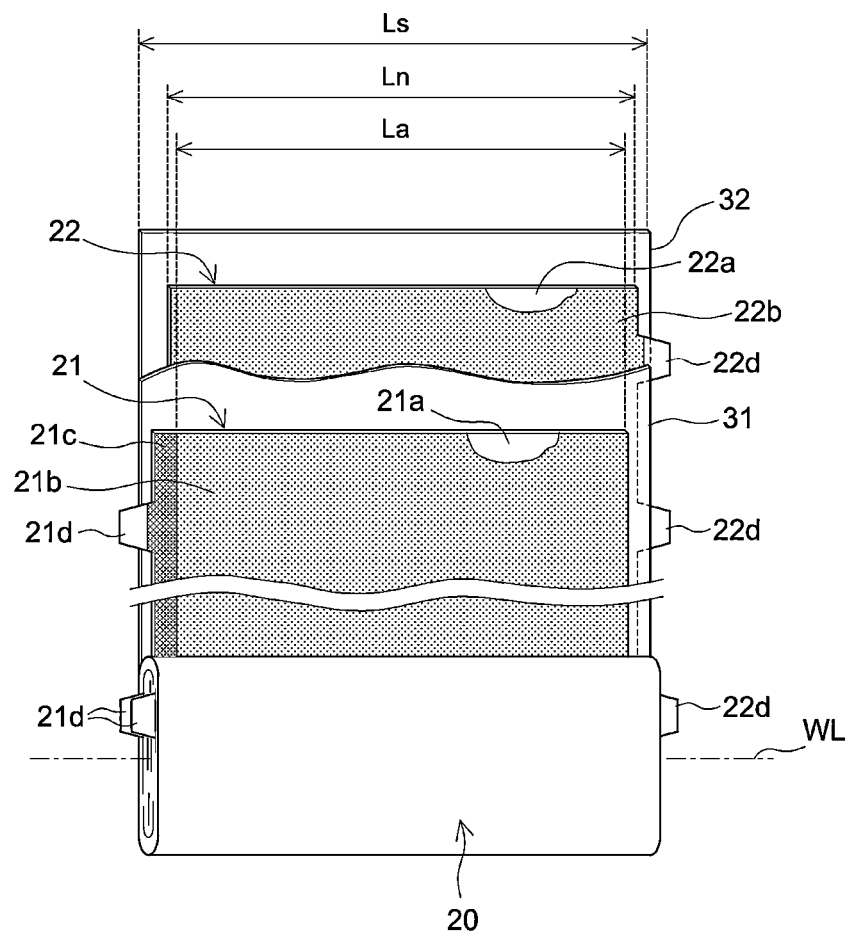
FIG. 2 is a schematic view of a wound electrode assembly 20.

FIG. 2 is a schematic view of the wound electrode assembly 20. FIG. 2 shows the wound electrode assembly 20 one end of which is unrolled. In the wound electrode assembly 20, as illustrated in FIG. 2, for example, a positive electrode plate 21, a first separator 31, a negative electrode plate 22, and a second separator 32, each of which is in a long strip shape, are stacked successively with their longitudinal axes aligned with each other and are wound around a winding axis WL that is set in a widthwise direction.

The positive electrode plate 21 includes a positive electrode substrate 21a, a positive electrode active material layer 21b, a protective layer 21c, and tabs 21d. The positive electrode substrate 21a is the substrate material of the positive electrode plate 21. The positive electrode substrate 21a is formed of a predetermined metal foil (for example, aluminum foil). The positive electrode active material layer 21b is formed with a constant width on both faces of the positive electrode substrate 21a except for one lateral end portion thereof. The protective layer 21c is formed on both sides of the positive electrode plate 21. The protective layer 21c is formed in a portion of the positive electrode substrate 21a that is other than the portion on which the positive electrode active material layer 21b is formed. In addition, the tabs 21d protruding in a lateral direction are formed at a lateral end of the positive electrode substrate 21a on which the protective layer 21c is formed. The tabs 21d with a predetermined width protrude partially from the lateral end on which the protective layer 21c is formed, so that the positive electrode substrate 21a is exposed.

The positive electrode active material layer 21b is a layer containing a positive electrode active material. In a lithium-ion secondary battery, for example, the positive electrode active material is a material that is capable of releasing lithium ions during charge and absorbing lithium ions during discharge, such as lithium-transition metal composite materials. Generally, other than the lithium-transition metal composite materials, various materials have been proposed for use as the positive electrode active material, and the positive electrode active material is not limited to any particular material. Suitable examples of the positive electrode active material include, for example, lithium-transition metal composite oxides. Among the lithium-transition metal composite oxides, particularly suitable are lithium-transition metal composite oxides containing at least one transition metal selected from the group consisting of nickel (Ni), cobalt (Co), and manganese (Mn). Specific examples include lithium-nickel-cobalt-manganese composite oxide (NCM), lithium-nickel composite oxide, lithium-cobalt composite oxide, lithium-manganese composite oxide, lithium-nickel-manganese composite oxide, lithium-nickel-cobalt-aluminum composite oxide (NCA), and lithium-iron-nickel-manganese composite oxide. Suitable examples of lithium-transition metal composite oxides that do not contain Ni, Co, or Mn include lithium-iron-phosphate composite oxide (LFP).

It should be noted that the term "lithium-nickel-cobalt-manganese composite oxide" in the present description means to include oxides that contain additional elements other than the main constituent elements (Li, Ni, Co, Mn, and O). Examples of such additional elements include transition metal elements and main group metal elements, such as Mg, Ca, Al, Ti, V, Cr, Si, Y, Zr, Nb, Mo, Hf, Ta, W, Na, Fe, Zn, and Sn. The additional elements may include metalloid elements, such as B, C, Si, and P, and non-metallic elements, such as S, F, Cl, Br, and I. The positive electrode active material layer 21b may contain addition agents other than the positive electrode active material. Examples of such addition agents may include conductive agents and binders. Examples of the conductive agents include carbon materials such as acetylene black (AB). Examples of the binders include resin binders such as polyvinylidene fluoride (PVdF). When the total solid content of the positive electrode active material layer 21b is 100 mass %, the content of the positive electrode active material may be approximately greater than or equal to 80 mass %, and typically greater than or equal to 90 mass %.

The protective layer 21c is a layer configured to reduce electrical conductivity. Such a protective layer 21c is provided in a region adjacent to an edge portion of the positive electrode active material layer 21b. The protective layer 21c may serve to prevent the positive electrode substrate 21a and the negative electrode active material layer 22b from coming into contact with each other directly and causing internal short circuits when either of the separators 31 and 32 is damaged. For the protective layer 21c, it is possible to form a layer containing electrically insulative ceramic particles, for example. Examples of such ceramic particles include: inorganic oxides, such as alumina ($Al_2O_3$), magnesia (MgO), silica ($SiO_2$), and titania ($TiO_2$); nitrides, such as aluminum nitride and silicon nitride; metal hydroxides, such as calcium hydroxide, magnesium hydroxide, and aluminum hydroxide; clay minerals, such as mica, talc, boehmite, zeolite, apatite, and kaoline; and glass fibers. Taking electrical insulation and heat resistance into consideration, suitable among them are alumina, boehmite, aluminum hydroxide, silica, and titania. The protective layer 21c may contain a binder for fixing the ceramic particles onto the surface of the positive electrode substrate 21a. Examples of such a binder include resin binders such as polyvinylidene fluoride (PVdF). The protective layer 21c may contain a trace amount of conductive agent (for example, a carbon material such as carbon black). By adding the conductive agent, the protective layer may be made to have slight electrical conductivity. The amount of the conductive agent to be added may be adjusted to an amount that can obtain required electrical conductivity. Note that the protective layer is not an essential constituent component of the positive electrode plate. That is, the secondary battery disclosed herein may also use a positive electrode plate that is not provided with a protective layer.

The negative electrode plate 22 includes a negative electrode substrate 22a, a negative electrode active material layer 22b, and tabs 22d. The negative electrode substrate 22a is the substrate material of the negative electrode plate 22. The negative electrode substrate 22a is formed of a predetermined metal foil (for example, copper foil). The negative electrode active material layer 22b is formed on both sides of the negative electrode substrate 22a substantially along the entire width of the negative electrode substrate 22a. The negative electrode substrate 22a is provided with the tabs 22d protruding from one lateral end thereof. The tabs 22d with a predetermined width protrude partially from the one lateral end of the negative electrode substrate 22a.

The negative electrode active material layer 22b is a layer containing a negative electrode active material. The negative electrode active material is not particularly limited, as long as the negative electrode active material is able to reversibly absorb and release charge carriers in relation to the above-described positive electrode active material. Examples of the negative electrode active material include carbon materials and silicon based materials. The carbon materials may be, for example, graphite, hard carbon, soft carbon, amorphous carbon, and the like. It is also possible to use amorphous carbon-coated graphite, in which the surface of graphite is coated with amorphous carbon, or the like. Examples of the silicon based materials include silicon and silicon oxide (silica). The silicon based materials may also contain other metal elements (such as alkaline-earth metals) and oxides thereof. The negative electrode active material layer 22b may contain addition agents other than the negative electrode active material. Examples of such addition agents may include binders and thickening agents. Specific examples of the binders include rubber-based binders, such as styrene-butadiene rubber (SBR). Specific examples of the thickening agents include carboxymethylcellulose (CMC). When the total solid content of the negative electrode active material layer 22b is 100 mass %, the content of the negative electrode active material is approximately greater than or equal to 30 mass %, and typically greater than or equal to 50 mass %. The negative electrode active material may account for greater than or equal to 80 mass %, or greater than or equal to 90 mass %, of the negative electrode active material layer 22b.

Each of the separators 31 and 32 may be formed of, for example, an electrolyte permeable porous resin sheet with required heat resistance. Various embodiments of the separators 31 and 32 have been proposed, and the separators 31 and 32 are not particularly limited. Suitable examples of the separators 31 and 32 include a separator including a porous substrate layer made of resin such as polyolefin resin [for example, polyethylene (PE) or polypropylene (PP)]. It is also possible that a coat layer may be formed on one side or both sides of the porous substrate layer as appropriate. The coat layer may include an adhesive layer and a porous surface layer containing electrically insulative inorganic material. The porous surface layer is excellent in heat resistance and is therefore able to prevent shrinkage and breakage of the separators 31 and 32 due to temperature increase. Examples of the inorganic materials for the porous surface layer include ceramic particles of alumina, boehmite, aluminum hydroxide, titania, and the like. In addition, the porous surface layer contains a binder for binding the ceramic particles. The binder may be resin binders such as polyvinylidene fluoride (PVdF) and acrylic resins. It should be noted that the two separators 31 and 32 used in the present embodiment may be constructed of either the same or different materials.

As illustrated in FIG. 2, the negative electrode active material layer 22b of the negative electrode plate 22 may cover the positive electrode active material layer 21b of the positive electrode plate 21 with the separators 31 and 32 interposed therebetween. The separators 31 and 32 may further cover the positive electrode active material layer 21b of the positive electrode plate 21 and the negative electrode active material layer 22b of the negative electrode plate 22. Although not shown in the drawings, the lengths of the positive electrode plate 21, the negative electrode plate 22, and the separators 31 and 32 may satisfy the relation: the length of separators 31 and 32>the length of negative electrode plate 22>the length of positive electrode plate 21. The width La of the positive electrode active material layer 21b, the width Ln of the negative electrode active material layer 22b, and the width Ls of the separators 31 and 32 may satisfy the relation: Ls>Ln>La. In the portion in which the positive electrode plate 21 and the negative electrode plate 22 are stacked, a portion on which the positive electrode active material layer 21b is formed is covered by the negative electrode active material layer 22b. In addition, a protective layer 21c is formed on a portion of the positive electrode plate 21 in which the negative electrode active material layer 22b overlaps the positive electrode plate 21 but does not oppose the positive electrode active material layer 21b.

As illustrated in FIG. 2, the tabs 21d of the positive electrode plate 21 protrude from one lateral end of the separators 31 and 32. The positive electrode plate 21 is provided with a plurality of tabs 21d arranged along the longitudinal axis at a predetermined pitch. The tab 22d of the negative electrode plate 22 protrude from the other lateral end of the separators 31 and 32. The negative electrode plate 22 is provided with a plurality of tabs 22d arranged along the longitudinal axis at a predetermined pitch. The plurality of tabs 21d of the positive electrode plate 21 and the plurality of tabs 22d of the negative electrode plate 22 are arranged at a predetermined pitch so that they are located generally at the matching positions after the positive electrode plate 21 and the negative electrode plate 22 are wound into the wound electrode assembly 20. The tabs 21d of the positive electrode plate 21 and the tabs 22d of the negative electrode plate 22 may be formed at the respective stages where the positive electrode plate 21 and the negative electrode plate 22 are prepared. It is also possible that the tabs 21d of the positive electrode plate 21 and the tabs 22d of the negative electrode plate 22 may be formed by cutting out portions of the electrode plates after the wound electrode assembly 20 has been wound.

As illustrated in FIGS. 1 and 2, the wound electrode assembly 20 is placed into the outer container 11 from the open end 11f, to which the sealing plate 12 is to be fitted. For this reason, the wound electrode assembly 20 is in a flat shape corresponding to the shape of the open end 11f. When preparing the wound electrode assembly 20 in such a fashion, the wound electrode assembly 20 may be wound on a flat-shaped mandrel. Alternatively, when preparing the wound electrode assembly 20, the wound electrode assembly 20 may be wound on a cylindrical-shaped mandrel and thereafter press-formed into a flat shape. The wound electrode assembly 20 and the outer container 11 are electrically insulated from each other by an insulating sheet 90 made of resin and disposed between the wound electrode assembly 20 and the outer container 11. The insulating sheet 90 is a resinous sheet and is bent into a box shape so as to surround the wound electrode assembly 20. Note that FIG. 1 shows the battery 2 from which the front-side wider surface of the insulating sheet 90 is also removed.

Winding Machine 100

Next, a winding machine 100 will be described. FIGS. 3 to 6 each show a schematic view of the winding machine 100. The winding machine 100 is an example of the winding machine that embodies a method of manufacturing a battery as disclosed herein. FIGS. 3 to 6 each show a view of a turret 120 portion of the winding machine 100, which is viewed from the far end of a rotational axis Cl of the turret 120.

Figure 3:
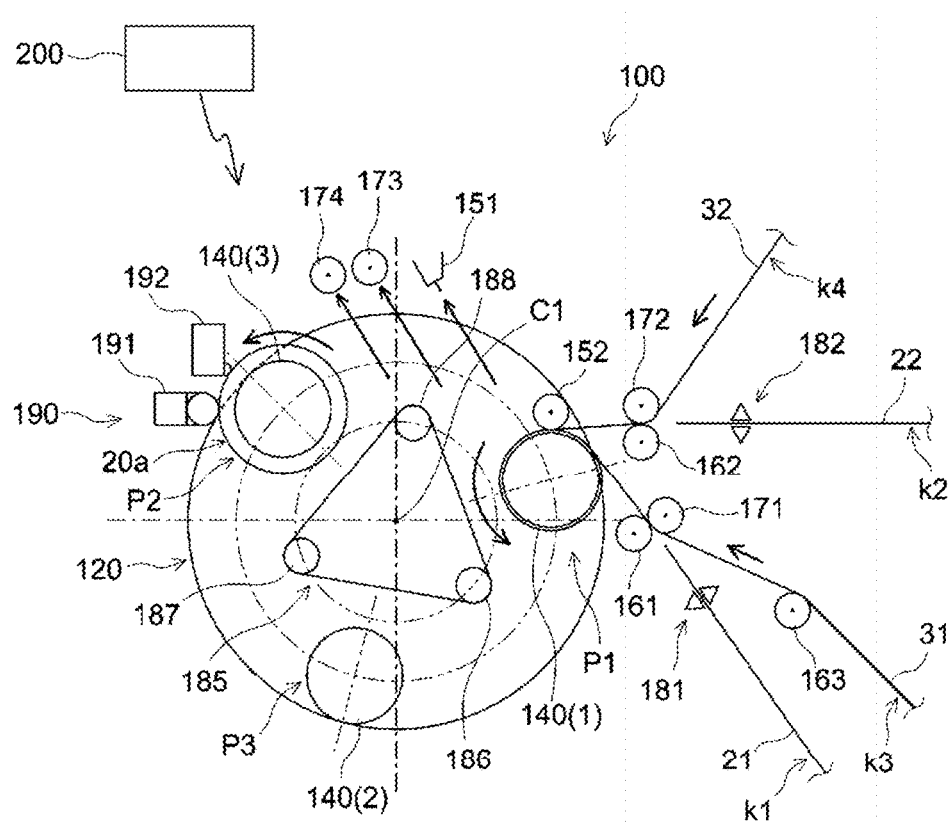
FIG. 3 is a schematic view of a winding machine 100.
Figure 4:
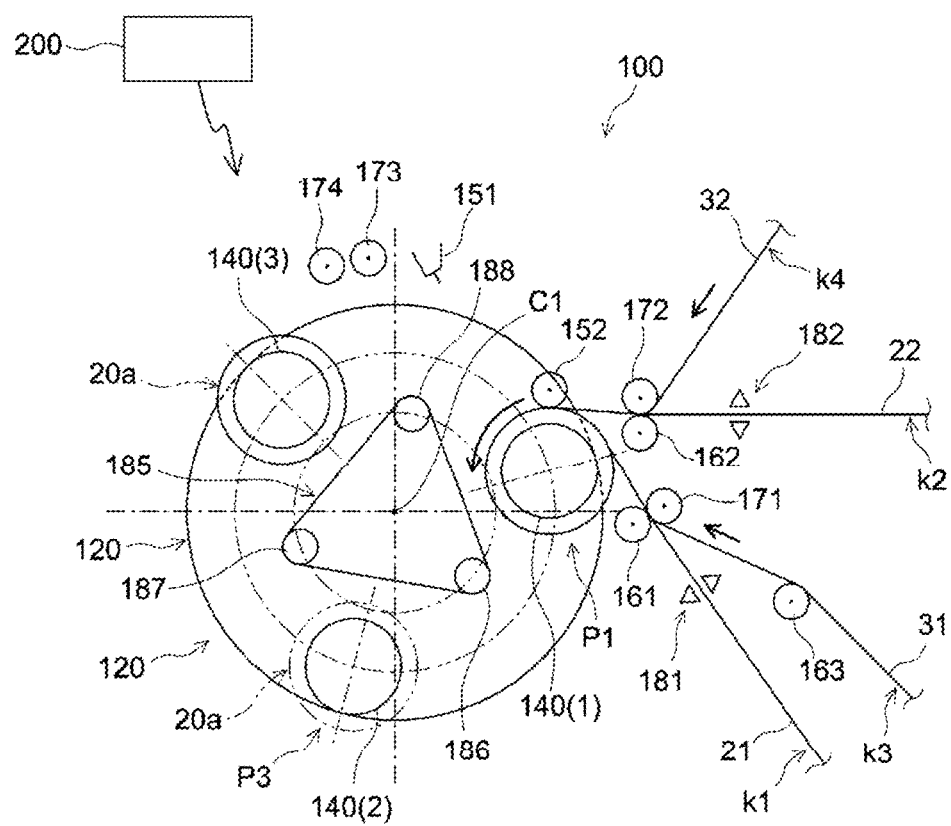
FIG. 4 is another schematic view of the winding machine 100.
Figure 5:
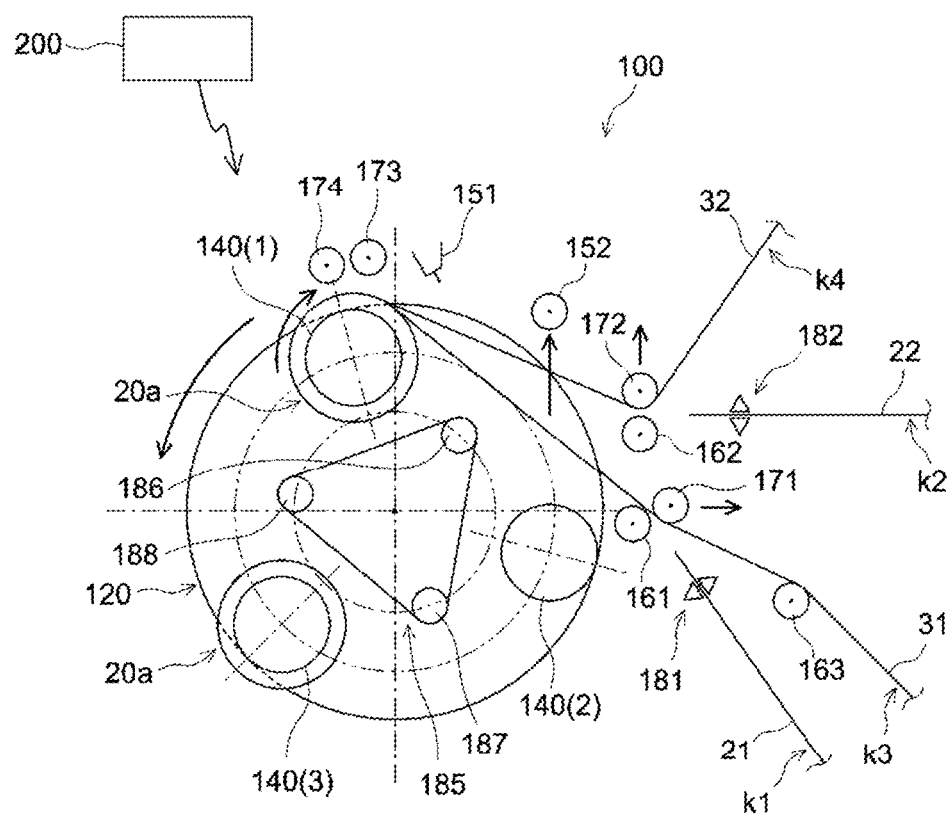
FIG. 5 is still another schematic view of the winding machine 100.
Figure 6:
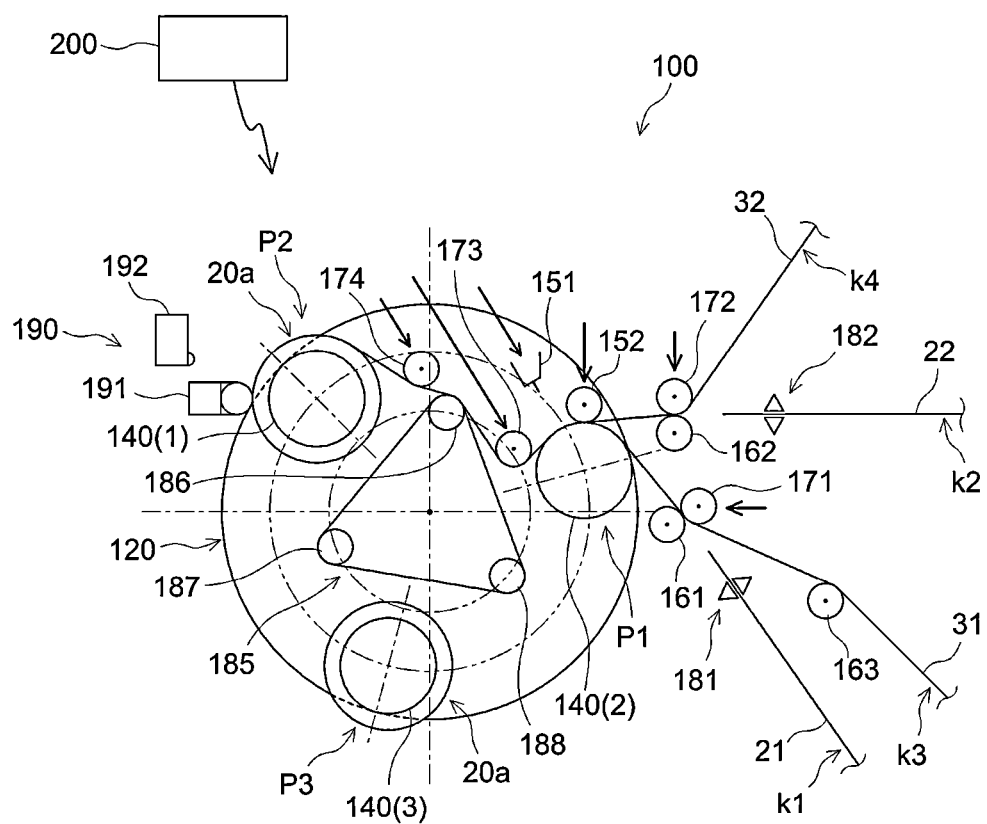
FIG. 6 is still another schematic view of the winding machine 100.

FIG. 3 illustrates a stand-by state, in which the winding machine 100 starts to newly wind a positive electrode plate 21 and a negative electrode plate 22. FIG. 4 illustrates a state in which the positive electrode plate 21 and the negative electrode plate 22 are being newly wound by the winding machine 100. FIG. 5 illustrates a state in which a winding core 140, on which the positive electrode plate 21 and the negative electrode plate 22 have been wound, is moved from a first position P1 to a second position P2. FIG. 6 illustrates a state in which the winding core 140, on which the positive electrode plate 21 and the negative electrode plate 22 have been wound, is moved to the second position P2, another winding core is moved to the first position P1, and the separators 31 and 32 are cut.

As illustrated in FIG. 3, the winding machine 100 is an apparatus for winding the positive electrode plate 21, the negative electrode plate 22, and the separators 31 and 32. The turret 120 is provided with a plurality of winding cores 140(1)-(3), around which a positive electrode plate 21, a negative electrode plate 22, and separators 31 and 32 are to be wound.

The winding machine 100 includes, as illustrated in FIG. 3, transfer paths k1 to k4, a turret 120, a plurality of winding cores 140(1)-(3), a cutter 151, a presser roller 152, a plurality of stationary rollers 161 to 163, a plurality of movable rollers 171 to 174, a first chuck 181, a second chuck 182, an index unit 185 provided on the turret 120, index rollers 186 to 188 provided in the index unit 185, a winding termination device 190, and a controller 200. The positive electrode plate 21, the negative electrode plate 22, and the separators 31 and 32 are prepared in such a condition that they are wound around respective reels (not shown) or the like. Each of the constituent components of the winding machine 100 may include a required actuator when appropriate. The controller 200 is configured to control various constituent components of the winding machine 100 so that required operations can be performed at predetermined timing according to predetermined programs. The controller 200 may be embodied by a computer such as a microcontroller, for example.

Transfer Paths k1 to k4

The transfer path k1 is a path in which the positive electrode plate 21 is delivered from the reel toward the turret 120. The transfer path k2 is a path in which the negative electrode plate 22 is delivered from the reel toward the turret 120. The transfer path k3 is a path in which the first separator 31 is delivered from the reel toward the turret 120. The transfer path k4 is a path in which the second separator 32 is delivered from the reel toward the turret 120. The positive electrode plate 21, the negative electrode plate 22, the first separator 31, and the second separator 32 are each in a strip shape, and they are delivered along predetermined transfer paths k1 to k4, respectively. The transfer path k1 of the positive electrode plate 21 merges with the transfer path k3 of the first separator 31 before reaching the winding core 140 disposed at the first position P1. The transfer path k2 of the negative electrode plate 22 merges with the transfer path k4 of the second separator 32 before reaching the winding core 140 disposed at the first position P1. The transfer paths k1 to k4 may be provided with, for example, a dancer roller mechanism that takes up the slack in the positive electrode plate 21, the negative electrode plate 22, the first separator 31, and the second separator 32 that are delivered, a tensioner that adjusts their tensions, and the like, as appropriate.

Turret 120

The turret 120 is a rotary disk the rotational axis of which is disposed at its center Cl. A plurality (three in this embodiment) of winding cores 140 are disposed on the turret 120. The plurality of winding cores 140 are substantially cylindrical-shaped mandrels that are rotatable independently from each other. In this embodiment, the axes of the plurality of winding cores 140 are disposed so as to be parallel to the central axis of the turret 120. The turret 120 is provided with three winding cores 140, a first winding core 140(1), a second winding core 140(2), and a third winding core 140(3). The first winding core 140(1), the second winding core 140(2), and the third winding core 140(3) are disposed around the central axis of the turret 120 so as to be circumferentially equally spaced from each other. The first winding core to the third winding core 140(1)-(3) each have the same configuration. Although not shown in the drawings, the turret 120 is provided with a required actuator (for example, a servomotor) to rotate by an appropriate angle at appropriate timing.

A first position P1, a second position P2, a third position P3 are predetermined around the axis of the center Cl of the turret 120. In FIG. 3, the first winding core 140(1) is disposed at the first position P1, the third winding core 140(3) is disposed at the second position P2, and the second winding core 140(2) is disposed at the third position P3. The positions of the first winding core to the third winding core 140(1)-(3) are not fixed to the positions shown in FIG. 3. In this embodiment, the turret 120 rotates counterclockwise. The first winding core to the third winding core 140(1)-(3) also rotate counterclockwise. The first winding core to the third winding core 140(1)-(3) move successively from one position to another, from the first position P1, to the second position P2, and to the third position P3, due to rotation of the turret 120. Although not shown in the drawings, each of the first winding core to the third winding core 140(1)-(3) is provided with a required actuator (for example, a servomotor) to rotate at an appropriate speed at appropriate timing. Herein, each of the first winding core to the third winding core 140(1)-(3) is referred to as a winding core 140 when no distinction is necessary. However, when the first winding core to the third winding core 140(1)-(3) need to be distinguished, they are respectively designated as a winding core 140(1), a winding core 140(2) and a winding core 140(3) as appropriate.

Winding Core 140

Figure 7:
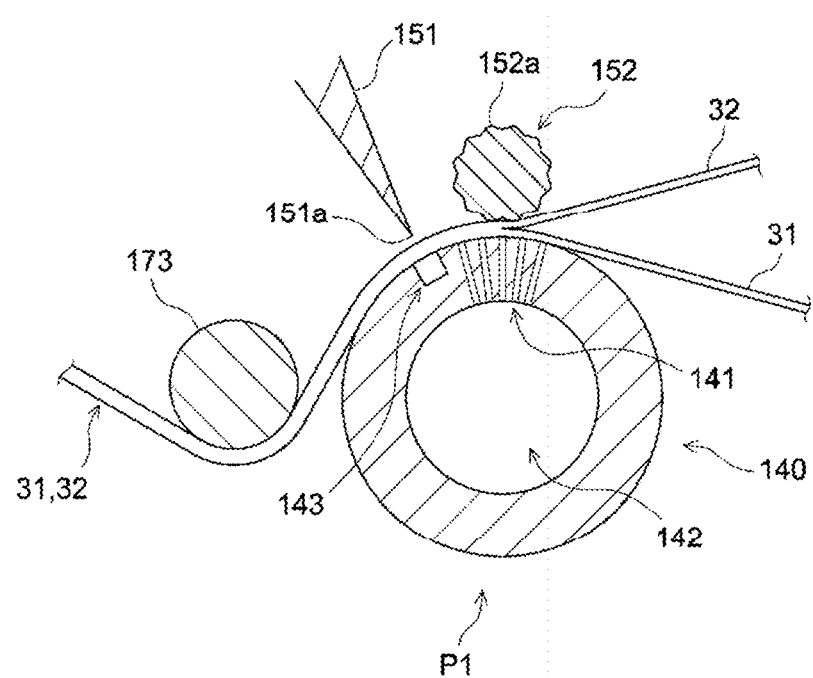
FIG. 7 is a cross-sectional view schematically illustrating a winding core 140 disposed at a first position P1.

FIG. 7 is a cross-sectional view schematically illustrating a winding core 140 disposed at the first position P1. The winding core 140 is a substantially cylindrical member. FIG. 7 shows a winding core 140 viewed in an axial direction, which illustrates a state in which, as shown in FIG. 3, the first separator 31 and the second separator 32 are wound around the winding core 140 disposed at the first position P1. The winding core 140 has the function to retain the separators 31 and 32 that are to be wound on its circumferential surface, as illustrated in FIG. 4. In this embodiment, the winding core 140 includes suction holes 141, a suction passage 142, and a groove 143. The suction holes 141 are holes provided for the purpose of suction-attaching the separators 31 and 32 to be wound on the circumferential surface. The suction passage 142 is a flow passage that is formed inside the winding core 140 and is in communication with the suction holes 141. The suction passage 142 is a flow passage provided for the purpose of providing negative pressure to the suction holes 141. The suction passage 142 may be configured to, for example, be connected to a vacuum line (not shown) that is provided externally, to provide negative pressure. The groove 143 is formed as a receiving portion that receives a blade of the cutter 151 when the separators 31 and 32 are cut. In this embodiment, the groove 143 is formed in the outer circumferential surface of the winding core 140 along the axial direction of the winding core 140. Although the winding core 140 is in a substantially cylindrical shape in this embodiment, it is also possible to use a flat winding core when the winding needs to be in a flat shape. The winding core may be such a winding core that is divided along a radial direction. The winding core divided along a radial direction may be such that the diameter of the winding core is variable.

Cutter 151

The cutter 151 is a cutter that cuts the separators 31 and 32. The cutter 151 is configured so that its blade 151a is pressed against the separators 31 and 32 that are retained on the winding core 140 disposed at the first position P1. In this embodiment, the cutter 151 may be pushed along a guide to a position defined so that the blade 151a can be pressed against the separators 31 and 32 retained on the winding core 140, and may be retracted from that position. Although not shown in the drawings, the cutter 151 is operated so as to be actuated at appropriate timing by an actuator (for example, a cylinder mechanism). The blade 151a may be, for example, a wavy blade (saw blade).

Presser Roller 152

The presser roller 152 is a roller that presses the separators 31 and 32 against the winding core 140 disposed at the first position P1. The separators 31 and 32 are wound while being pressed onto the winding core 140 disposed at the first position P1 by such a presser roller 152. The presser roller 152 functions as a presser jig that presses the separators 31 and 32 against the winding core 140 disposed at the first position P1. In this embodiment, as illustrated in FIG. 7, the presser roller 152 is provided with a plurality of protrusions 152a formed on the outer circumferential surface. In the example shown in FIG. 7, the plurality of protrusions 152a are corrugations. As the roller 152 provided with such protrusions 152a causes the two separators 31 and 32 to be pressed against the winding core 140, the protrusions 152a serve to intensively apply the force locally, so that the separators 31 and 32 can be pressed strongly. As a result, the separators 31 and 32 are pressed to stick together more suitably. The presser roller 152 may be, for example, in a substantially cylindrical shape, and the circumferential surface thereof may be knurled. The presser roller 152 may be configured to press the separators 31 and 32 onto the winding core 140 disposed at the first position P1 at an appropriate pressure by means of, for example, a mechanism interiorly equipped with a spring or the like. Also, by means of a guide and an actuator that are not shown in the drawings, the presser roller 152 is moved between a position (see FIG. 3) at which it is pressed onto the separators 31 and 32 that are wound on the winding core 140 disposed at the first position P1 and a position (see FIG. 5) at which it is detached from the winding core 140. The presser roller 152 may be composed of a single cylindrical roller provided along a lateral direction of the winding core 140, or may include a plurality of rollers intermittently disposed along the lateral direction of the winding core 140.

Stationary Roller 161, Movable Roller 171

The stationary roller 161 is provided at a position at which the transfer path k3 of the first separator 31 and the transfer path k1 of the positive electrode plate 21 merge. The movable roller 171 is a roller that presses the first separator 31 onto the stationary roller 161 to clamp the first separator 31 therebetween. The movable roller 171 is moved in a predetermined direction by means of a guide and an actuator. The movement of the movable roller 171 is controlled by the controller 200. The movable roller 171 is configured to be movable between a position at which it presses the first separator 31 against the stationary roller 161 and a position at which it is detached from the stationary roller 161. The movable roller 171 may be configured to clamp the first separator 31 with a predetermined force by, for example, a spring or the like, when the first separator 31 needs to be clamped. The first separator 31 is clamped by the stationary roller 161 and the movable roller 171 with an appropriate force so that it can be delivered toward the winding core 140 without slack.

Stationary Roller 162, Movable Roller 172

The stationary roller 162 is provided at a position at which the transfer path k4 of the second separator 32 and the transfer path k2 of the negative electrode plate 22 merge. The movable roller 172 is a roller that presses the second separator 32 onto the stationary roller 162 to clamp the second separator 32 therebetween. The movable roller 172 is moved in a predetermined direction by means of a guide and an actuator. The movement of the movable roller 172 is controlled by the controller 200. The movable roller 172 is configured to be movable between a position at which it presses the second separator 32 against the stationary roller 162 and a position at which it is detached from the stationary roller 162. The movable roller 172 may be configured to clamp the second separator 32 with a predetermined force by, for example, a spring or the like, when the second separator 32 needs to be clamped. The second separator 32 is clamped by the stationary roller 162 and the movable roller 172 with an appropriate force so that it can be delivered toward the winding core 140 without slack.

Stationary Roller 163

The stationary roller 163 is disposed at a predetermined position in the transfer path k3 of the first separator 31, and the stationary roller 163 serves to determine the transfer path k3 of the first separator 31.

First Chuck 181

As illustrated in FIG. 3, the first chuck 181 is disposed in front of a pair of rollers 161 and 171 that clamp the first separator 31, in the transfer path k1 in which the positive electrode plate 21 is delivered. The first chuck 181 is a member that grips the positive electrode plate 21. In this embodiment, the first chuck 181 includes a pair of gripping members. Although not shown in the drawings, the first chuck 181 includes a cutter that cuts the positive electrode plate 21. Although not shown in the drawings, the first chuck 181 is operated at appropriate timing by a guide and an actuator (for example, a cylinder mechanism). The operation of the first chuck 181 is configured to be controlled by the controller 200.

In the state shown in FIG. 3, the first separator 31 is retained by the winding core 140 disposed at the first position P1 and is sandwiched by the pair of rollers 161 and 171, to extend along the transfer path k3. The first chuck 181 grips the positive electrode plate 21 in front of the pair of rollers 161 and 171. When the positive electrode plate 21 is taken up on the winding core 140 disposed at the first position P1, the first chuck 181 inserts the retained positive electrode plate 21 into the gap between the pair of rollers 161 and 171, and releases the positive electrode plate 21, as illustrated in FIG. 4. Thereby, the positive electrode plate 21, together with the first separator 31, is pulled between the pair of rollers 161 and 171 and is taken up on the winding core 140 disposed at the first position P1. When the positive electrode plate 21 is delivered by a predetermined length, the winding core 140 stops the take-up operation. The positive electrode plate 21 is gripped by the first chuck 181 and is cut between the first chuck 181 and the pair of rollers 161 and 171. The first chuck 181 is configured to move appropriately between a predetermined position at which it grips the positive electrode plate 21 and a predetermined position at which it inserts the positive electrode plate 21 into the gap between the pair of rollers 161 and 171.

Second Chuck 182

As illustrated in FIG. 3, the second chuck 182 is disposed in front of a pair of rollers 162 and 172 that clamp the second separator 32, in the transfer path k2 in which the negative electrode plate 22 is delivered. The second chuck 182 is a member that grips the negative electrode plate 22. In this embodiment, the second chuck 182 includes a pair of gripping members. Although not shown in the drawings, the second chuck 182 includes a cutter that cuts the negative electrode plate 22. Although not shown in the drawings, the second chuck 182 is operated at appropriate timing by a guide and an actuator (for example, a cylinder mechanism). The operation of the second chuck 182 is configured to be controlled by the controller 200.

In the state shown in FIG. 3, the second separator 32 is retained by the winding core 140 disposed at the first position P1 and is sandwiched by the pair of rollers 162 and 172, to extend along the transfer path k4. The second chuck 182 grips the negative electrode plate 22 in front of the pair of rollers 162 and 172. When the negative electrode plate 22 is taken up on the winding core 140 disposed at the first position P1, the second chuck 182 inserts the retained negative electrode plate 22 into the gap between the pair of rollers 162 and 172, and releases the negative electrode plate 22, as illustrated in FIG. 4. Thereby, the negative electrode plate 22, together with the second separator 32, is pulled between the pair of rollers 162 and 172 and is taken up on the winding core 140 disposed at the first position P1. As mentioned previously, when the positive electrode plate 21 is delivered by a predetermined length, the winding core 140 stops the taking-up operation. In other words, when the negative electrode plate 22 is delivered by a predetermined length, the winding core 140 stops the take-up operation. The negative electrode plate 22 is gripped by the second chuck 182 and is cut between the second chuck 182 and the pair of rollers 162 and 172. The second chuck 182 is configured to move appropriately between a predetermined position at which it grips the negative electrode plate 22 and a predetermined position at which it inserts the negative electrode plate 22 into the gap between the pair of rollers 162 and 172.

The positive electrode plate 21 and the negative electrode plate 22 may be inserted respectively between the pair of rollers 161 and 171 and between the pair of rollers 162 and 172, for example, after the first separator 31 and the second separator 32 are wound approximately one time around the outer circumferential surface of the winding core 140.

Movable Roller 173

As illustrated in FIG. 6, the movable roller 173 is a roller that presses the first separator 31 and the second separator 32 against the winding core 140 disposed at the first position P1 when the first separator 31 and the second separator 32 are cut. The movable roller 173 is moved in a predetermined direction by means of a guide and an actuator. The movement of the movable roller 173 is controlled by the controller 200. As illustrated in FIG. 6, when the first separator 31 and the second separator 32 are cut, the movable roller 173 is disposed at a position at which the movable roller 173 presses the first separator 31 and the second separator 32 against the winding core 140 disposed at the first position P1. At other times, the movable roller 173 moves to, as illustrated in FIG. 3, a position that is detached from the winding core 140 disposed at the first position P1. The movable roller 173 may be configured to clamp the first separator 31 with a predetermined force by, for example, a spring or the like, when it presses the first separator 31 and the second separator 32 against the winding core 140.

As illustrated in FIG. 6, the cutter 151 is pressed against the winding core 140 disposed at the first position P1 so that the first separator 31 and the second separator 32 can be cut. In this embodiment, as illustrated in FIG. 7, the groove 143 is formed in the outer circumferential surface of the winding core 140. When the cutter 151 is pressed against the winding core 140, the groove 143 formed in the outer circumferential surface of the winding core 140 is disposed to face the position where the cutter 151 is pressed. With the groove 143 disposed so as to face the cutter 151, the first separator 31 and the second separator 32 are pressed against the winding core 140 by the movable roller 173. This allows the first separator 31 and the second separator 32 to be attached to the winding core 140. Further, in this state, the cutter 151 is pressed against the first separator 31 and the second separator 32 that is retained on the winding core 140. As a result, the first separator 31 and the second separator 32 are cut. Because the blade of the cutter 151 goes into the groove 143 of the winding core 140, the first separator 31 and the second separator 32 can be cut more reliably and more cleanly. Moreover, the winding core 140 is unlikely to be damaged, and contaminants are unlikely to form.

Movable Roller 174

The movable roller 174 is a roller that applies tension to the first separator 31 and the second separator 32, as illustrated in FIG. 6, when the first separator 31 and the second separator 32 are cut. The movable roller 174 is moved in a predetermined direction by means of a guide and an actuator. The movement of the movable roller 174 is controlled by the controller 200.

For example, as illustrated in FIG. 4, the positive electrode plate 21, the first separator 31, the negative electrode plate 22, and the second separator 32 are stacked respectively and wound up by the winding core 140(1) disposed at the first position P1. The winding core 140(1), which has taken up the positive electrode plate 21, the first separator 31, the negative electrode plate 22, and the second separator 32, moves from the first position P1 to the second position P2, as illustrated in FIG. 5. At that time, another winding core 140(2) moves to the first position P1. Then, as illustrated in FIG. 6, the first separator 31 and the second separator 32 are suction-attached to the winding core 140(2), which is newly disposed at the first position P1, so that the first separator 31 and the second separator 32 are retained on the outer circumferential surface of the winding core 140(2). At this time, the first separator 31 and the second separator 32 that have been wound up on the winding core 140(1) disposed at the second position P2 are retained in a continuous condition on the outer circumferential surface of the winding core 140(2) disposed at the first position P1.

When the winding core 140(1) moves from the first position P1 to the second position P2, the movable roller 174 is pushed toward the first separator 31 and the second separator 32 at appropriate timing, so as to be pressed onto the first separator 31 and the second separator 32, as illustrated in FIG. 6. By the movable roller 174, the first separator 31 and the second separator 32 are delivered without causing slack when the winding core 140(1) moves from the first position P1 to the second position P2. Other than this timing, the movable roller 174 is retracted to a position away from the turret 120, as illustrated in FIGS. 3 to 5.

Index Unit 185

The index unit 185 is provided at a central portion of the turret 120. On the turret 120, the three winding cores 140(1)-(3) are distributed uniformly along the circumferential direction, as described previously. The index unit 185 includes a substantially equilateral triangular shaped base that rotates together with the turret 120. At the apexes of the base, respective index rollers 186 to 188 are disposed, and the index rollers 186 to 188 are disposed respectively between the three winding cores 140(1)-(3).

The index unit 185 is constructed as follows. When the winding core 140(1) on which the positive electrode plate 21, the first separator 31, the negative electrode plate 22, and the second separator 32 are wound is moved from the first position P1 to the second position P2, one of the index rollers 186 to 188 that is placed from the first position P1 to the second position P2, namely the index roller 186, is pressed against the first separator 31 and the second separator 32 from radially inside. Such an index roller 186 and the movable roller 174 allow the first separator 31 and the second separator 32 to be delivered between the first position P1 and the second position P2 without causing slack. At the time shown in FIG. 6, the index roller 186 presses the first separator 31 and the second separator 32 from radially inside, and the index unit 185 rotates with rotation of the turret 120. Thus, the index rollers 186 to 188 of the index unit 185 each sequentially function, one by one, as a roller that presses the first separator 31 and the second separator 32 from radially inside when the winding core 140 around which the positive electrode plate 21, the first separator 31, the negative electrode plate 22, and the second separator 32 have been wound is moving from the first position P1 to the second position P2.

Winding Termination Device 190

As illustrated in FIG. 6, for example, the winding core 140(1), which has rolled up the positive electrode plate 21, the first separator 31, the negative electrode plate 22, and the second separator 32, moves to the second position P2, which is away from the first position P1. Then, after the separators 31 and 32 are cut, the cut portions of the separators 31 and 32 are rolled up to the cut edge portions. The winding termination device 190 is disposed at the second position P2. The winding termination device 190 includes a presser roller 191 and a tape attaching device 192. When the winding core 140 that has moved to the second position P2 rolls up the cut portions of the positive electrode plate 21, the first separator 31, the negative electrode plate 22, and the second separator 32 to the cut edge portions, the presser roller 191 is pressed against an outermost circumference portion of the second separator 32 that is wound around the winding core 140(1). As a result, the cut portions of the positive electrode plate 21, the first separator 31, the negative electrode plate 22, and the second separator 32 can be wound up without causing slack. The tape attaching device 192 is a device that attaches a tape for fixing the cut edge portion of the outermost circumference of the second separator 32 or the first separator 31. Such a winding termination process may be performed, for example, in parallel with the process of winding the first separator 31, the positive electrode plate 21, and the second separator 32, and the negative electrode plate 22 around the winding core 140(2) that is newly disposed at the first position P1.

Furthermore, in this embodiment, as illustrated in FIG. 6, for example, the winding machine 100 performs the winding termination process and newly winds up the positive electrode plate 21, the first separator 31, the negative electrode plate 22, and the second separator 32 on the winding core 140(2) disposed at the first position P1. Thereafter, the winding machine 100 allows the turret 120 to rotate. The winding core 140(1), for which the winding termination process has been performed, is moved to the third position P3, the winding core 140(2) is moved to the second position P2, and further another winding core 140(3) is disposed at the first position P1. At this time, the first separator 31 and the second separator 32 that have been wound up on the winding core 140(2) disposed at the second position P2 are retained in a continuous condition on the outer circumferential surface of the winding core 140(3) disposed at the first position P1. Then, after the separators 31 and 32 are cut, the winding termination process for the winding core 140(2) is performed at the second position P2. At the first position P1, the positive electrode plate 21, the first separator 31, the negative electrode plate 22, and the second separator 32 are newly wound around the winding core 140(3). At the third position P3, a wound stack 20a is removed from the winding core 140(1) (see FIG. 3). After removed from the winding core 140(1), the wound stack 20a is pressed into a flat shape, which can be handled as a wound electrode assembly 20. Thus, the winding cores 140(1)-(3) provided on the turret 120 move from the first position P1 to the third position P3 sequentially. The positive electrode plate 21, the first separator 31, the negative electrode plate 22, and the second separator 32 are continuously wound around the winding cores 140(1)-(3) one after another.

Herein, according to a method of manufacturing a battery 2 including a wound electrode assembly 20, the winding machine 100 embodies the following steps (A) to (D).

Step (A): Step (A) involves winding a first separator 31, a second separator 32, a positive electrode plate 21, and a negative electrode plate 22, which are delivered along respective predetermined transfer paths k1 to k4, onto a winding core 140(1) disposed at a first position P1 (see FIGS. 3 and 4).

Step (B): Step (B) involves moving the winding core 140(1) away from the first position P1 and disposing another winding core 140(2), which is different from the winding core 140(1), at the first position P1 (see FIG. 5).

Step (C): Step (C) involves cutting the first separator 31 and the second separator 32 wound on the winding core 140(1) that is moved away from the first position P1 in step (B) at a location on or near the other winding core 140(2) disposed at the first position P1 in step (B), with the first separator 31 and the second separator 32 being stacked and retained on an outer circumferential surface of the other winding core 140(2) disposed at the first position P1 in step (B) (see FIG. 6).

Step (D): Step (D) involves winding the first separator 31 and the second separator 32 onto the winding core 140(1) that is moved away from the first position P1 in step (B) up to a cut edge portion at which the first separator 31 and the second separator 32 have been cut in step (C) (see FIG. 6).

In the just-described method of manufacturing a battery, when cutting the first separator 31 and the second separator 32 wound around the winding core 140(1) that is moved away from the first position P1, another winding core 140(2) is disposed at the first position P1, as illustrated in FIG. 6. The first separator 31 and the second separator 32 are retained on the other winding core 140(2) in a continuous condition. After the first separator 31 and the second separator 32 are cut, a next wound stack can be produced continuously. Therefore, productivity is improved.

In addition, as illustrated in FIG. 6, the first separator 31 and the second separator 32 are cut at a location on or near the winding core 140(2) disposed at the first position P1, with the first separator 31 and the second separator 32 being stacked and retained on the outer circumferential surface of the other winding core 140(2). This makes it possible to eliminate or reduce the unrestrained area at the starting end portion of winding of the first separator 31 and the second separator 32 that are stacked and retained on the outer circumferential surface of the winding core 140(2) disposed at the first position P1 after the cutting. Therefore, bending is unlikely to occur at the starting end portion of winding of the first separator 31 and the second separator 32. In addition, the starting end portion of winding of the first separator 31 and the second separator 32 is retained on the outer circumferential surface of the winding core 140 and wound thereon. This reduces excess portions at the starting end portion of winding of the first separator 31 and the second separator 32.

From these viewpoints, it is possible that, when being cut in step (C), the length of the first separator 31 and the second separator 32 circumferentially wound on the winding core 140 disposed at the first position P1 may be set at, for example, a length that allows the first separator 31 and the second separator 32 to be stably wound around the winding core 140. For example, according to the knowledge of the present inventors, the first separator 31 and the second separator 32 may be cut with the first separator 31 and the second separator 32 being wound on a circumferential region of 15 degrees to 180 degrees of the other winding core 140(2) disposed at the first position P1 in step (B). From the viewpoint of stable winding, the first separator 31 and the second separator 32 may be wound on the winding core 140 with a sufficient length. Preferably, the first separator 31 and the second separator 32 may be cut with the first separator 31 and the second separator 32 being wound on a circumferential region of greater than or equal to 30 degrees of the winding core 140(2). Furthermore, from the viewpoint of handleability, the first separator 31 and the second separator 32 may be cut with the first separator 31 and the second separator 32 being wound on a region of greater than or equal to 30 degrees, more preferably greater than or equal to 45 degrees of the winding core 140. The first separator 31 and the second separator 32 may be cut with the first separator 31 and the second separator 32 being wound on a region of less than or equal to 150 degrees, more preferably less than or equal to 120 degrees of the winding core 140. Here, the angles may be specified by an angle about the winding center of the winding core that is viewed in the axial direction from the far end of the winding core 140. The term "region" means an arc portion of the sector shape centered on the winding center, which is on the outer circumferential surface of the winding core 140. When the just-mentioned region contains the groove 143, the region on which the first separator 31 and the second separator 32 are wound may be provided in a portion of the outer circumferential surface of the winding core 140 that excludes the groove 143.

Thus, the length of the first separator 31 and the second separator 32 circumferentially wound on the winding core 140(2) may be set appropriately when the first separator 31 and the second separator 32 are cut in step (C). This enables the winding on the winding core 140(2) disposed at the first position P1 in step (B) to start in a stable condition. Note that the groove 143 of the winding core 140 may be disposed in the region of the winding core 140 on which the first separator 31 and the second separator 32 are wound. In this case, in the region of the winding core 140 on which the first separator 31 and the second separator 32 are wound, there may be a portion in which the first separator 31 or the second separator 32 is not in contact with the winding core 140. Also, the wider the width of the first separator 31 and the second separator 32 is, the greater the contact area with the winding core 140. This enables the first separator 31 and the second separator 32 to be wound more stably. From such a viewpoint, the width of the first separator 31 and the second separator 32 may be, for example, greater than or equal to 20 cm, more preferably greater than or equal to 25 cm.

In step (C), the first separator 31 may be cut, with the first separator 31 being in contact with the other winding core 140 that is disposed at the first position P1 in step (B) in an upstream side and a downstream side of a cut position at which the first separator 31 is cut in the transfer path k3 of the first separator 31. In this embodiment, the second separator 32 is disposed on top of the first separator 31 with respect to the winding core 140. As illustrated in FIGS. 6 and 7, on the downstream side of the groove 143, the first separator 31 and the second separator 32 are sucked through the suction holes 141 with negative pressure and thereby suction-attached to the winding core 140. On the upstream side of the groove 143, the first separator 31 and the second separator 32 are pressed by the movable roller 173 so as to be fitted along the outer circumferential surface of the winding core 140.

When the downstream side of the groove 143 has a structure such that the suction holes 141 are formed on the outer circumferential side of the winding core 140 so that the separators 31 and 32 can be suction-attached and retained thereon, it is possible that a pressing member such as a movable roller may not be provided radially outside. This makes it possible to simplify the structure around the winding core 140 of the winding machine 100. From such a viewpoint, the downstream side of the groove 143 may adopt a structure that is capable of retaining the separators 31 and 32 by suction. When the separators 31 and 32 are retained by suction, it is also possible that the downstream side of the groove 143 may be additionally provided with a structure that presses the separators 31 and 32 onto the winding core 140 with a presser jig, such as the presser roller 152.

The upstream side of the groove 143 may be arranged so that, by restricting a portion of the first separator 31 that is more upstream of the region where the first separator 31 is in contact with the winding core 140 disposed at the first position P1 and is not in contact with the winding core 140 disposed at the first position P1 to be nearer to the winding core 140 disposed at the first position P1, the first separator 31 can come into contact with a portion of the winding core 140 that is adjacent to (that is, on the upstream side of) the groove 143 of the winding core 140 disposed at the first position P1. For example, in the embodiment shown in FIG. 6, this configuration is embodied by the movable roller 173.

In step (C), when cutting the first separator 31 and the second separator 32, the first separator 31 may be suction-attached to the winding core 140 disposed at the first position P1 in step (B). In this case, as illustrated in FIG. 7, the winding core 140 may include a plurality of suction holes 141. This allows the cut portion of the first separator 31 to be retained on the winding core 140 easily. This means that a chuck mechanism or the like that grips the cut portion of the first separator 31 is unnecessary, and no extra part is necessary for gripping the cut portion of the first separator 31.

In step (C), when cutting the first separator 31 and the second separator 32, the first separator 31 and the second separator 32 may be pressed onto the winding core 140 disposed at the first position P1 in step (B) by a presser jig (the presser roller 152 in the embodiment shown in FIG. 3). As a result, the first separator 31 and the second separator 32 are retained on the winding core 140 more stably. Moreover, when the first separator 31 is suction-attached to the winding core 140 as well, the first separator 31 can be suction-attached in a more stable condition. In this case, the presser jig may be a roller including a plurality of protrusions 152a formed on the outer circumferential surface, such as the presser roller 152 as described above. The roller including a plurality of protrusions 152a formed on the outer circumferential surface enables the first separator 31 and the second separator 32 to be pressed onto the winding core 140 by the plurality of protrusions 152a. Therefore, the first separator 31 can be suction-attached to the winding core 140 in a more stable condition.

The outer circumferential surface of the winding core 140 disposed at the first position P1 in step (B) may include a groove 143 formed along the axial direction of another winding core 140 corresponding to the position at which the first separator 31 and the second separator 32 are cut. In this case, because the first separator 31 and the second separator 32 are cut along the groove 143, the winding core 140 is unlikely to be damaged, and contaminants are unlikely to form. Here, it is desirable that the distance between the groove 143 and the region where the suction holes 141 are provided be shorter in the winding core 140. When the distance between the groove 143 and the region where the suction holes 141 are provided is shorter, the cut edge portions of the first separator 31 and the second separator 32 are suction-attached to the winding core 140 stably. From such a viewpoint, the distance between the groove 143 and the suction holes 141 may be, for example, less than or equal to 20 mm, more preferably less than or equal to 10 mm, or even more preferably less than or equal to 5 mm From the viewpoint of retaining the cut edge portions of the first separator 31 and the second separator 32, the suction holes 141 may be provided only on the downstream side of the groove 143 in the transfer paths k3 and k4 of the first separator 31 and the second separator 32. In addition, from the viewpoint of retaining the first separator 31 and the second separator 32 on the winding core 140 stably when cutting, the suction holes 141 may be provided on each of the upstream side and the downstream side of the groove 143.

In step (C), as illustrated in FIG. 7, the first separator 31 and the second separator 32 may be cut by a blade (the blade 151a of the cutter 151 in the embodiment shown in FIG. 7) that is movable toward the winding core 140 disposed at the first position P1 in step (B). Such cutting makes it possible to stably cut the first separator 31 and the second separator 32. Here, such cutting may be carried out at room temperature. It is also possible that the first separator 31 and the second separator 32 may be thermally cut by heating the blade 151a.

Furthermore, in the manufacturing method disclosed herein, the winding core 140 moved away from the first position P1 in step (B) may be disposed at the second position P2 in step (D), as illustrated in FIGS. 3 to 6. The method may further include the step of, at a third position P3 that is different from the first position P1 and the second position P2, removing a wound stack 20a including the first separator 31, the second separator 32, the positive electrode plate 21, and the negative electrode plate 22, from the winding core 140 that has been moved away from the first position P1 in step (B). The winding core 140 from which the wound stack 20a is removed at the third position P3 is thereafter moved to the first position P1 by rotation of the turret 120. Thus, in this winding machine 100, the winding cores 140 move sequentially to the first position P1, the second position P2, the third position P3, and again the first position P1, from one position to another. In step (A) of winding the first separator 31, the second separator 32, the positive electrode plate 21, and the negative electrode plate 22 onto the winding core 140, in steps (C) and (D) of cutting the first separator 31 and the second separator 32 and winding the first separator 31 and the second separator 32 onto the winding core 140 to their cut edge portions, and thereafter, in the step of removing the wound stack 20a from the winding core 140, the winding cores 140 change their positions so that each of these steps can be carried out in parallel. As a result, the wound stack 20a is manufactured continuously. This remarkably improves productivity in manufacture of the wound electrode assembly 20.

Hereinabove, embodiments of the method of manufacturing a battery according to the present disclosure and embodiments of the winding machine 100 that embodies the method have been described in detail. The winding machine 100 is merely an embodiment of the winding machine that embodies the method of manufacturing a battery, and the winding machine that embodies the method of manufacturing a battery is not limited to the above-described embodiments, unless specifically stated otherwise. For example, in the embodiments described above, three winding cores 140 are provided on the turret 120, and they are configured to be simultaneously moved by rotation of the turret 120. It is also possible that the turret 120 may be provided with a further greater number of winding cores, and a plurality of processes may be performed at a plurality of positions in parallel. Unless specifically stated otherwise, the plurality of winding cores may not be provided on the turret, and the plurality of winding cores may be configured to move independently from each other. Furthermore, even when the steps in the above method of manufacturing a battery are carried out in parallel, these steps may be either started simultaneously or started at shifted times appropriately.

The foregoing embodiments illustrate suction-attachment to the winding core as the mechanism of retaining the first separator and the second separator onto the winding core. Unless otherwise stated, the winding machine is not limited to such embodiments. For example, it is possible to adopt a mechanism that retains the first separator and the second separator on the winding core by pressing a roller against the winding core.

In the foregoing embodiments, the first separator 31 and the second separator 32 are cut at the groove 143 provided in the outer circumferential surface of the winding core 140. Unless otherwise stated, the winding machine is not limited to such embodiments. For example, the first separator and the second separator may be cut at a location on the winding core, not limited to the groove, for example, at a location at which they are in contact with the outer circumferential surface of the winding core. Alternatively, the first separator and the second separator may be cut at a location near the winding core, that is, at a location that is close to the winding core at which the first separator is not in contact with the outer circumferential surface of the winding core. For example, the position at which the first separator and the second separator are cut may be set to be less than or equal to 5 cm, or less than or equal to 3 cm, away from the position at which the first separator is in contact with the winding core. The closer the cut position is to the position at which the first separator is in contact with the winding core, the more likely it may be to reduce excessive separator remaining inside the wound electrode assembly 20 or to prevent the starting end portion of winding from bending.

Although the cylindrically shaped presser roller 152 is illustrated as an example of the presser jig, the presser jig is not limited to the embodiment of roller, but may be any member that presses the first separator 31 and the second separator 32 onto the winding core 140 disposed at the first position P1.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

The invention claimed is:

1. A method of manufacturing a battery including a wound electrode assembly, the method comprising the steps of:
   (A) winding a first separator, a second separator, a positive electrode plate, and a negative electrode plate onto a winding core disposed at a first position;
   (B) moving the winding core away from the first position and disposing a further winding core at the first position;
   (C) cutting the first separator and the second separator being wound on the winding core moved away from the first position in step (B), at a location on or near the further winding core disposed at the first position in step (B), with the first separator and the second separator being stacked and retained on an outer circumferential surface of the further winding core and being suction-attached to the outer circumferential surface of the further winding core; and (D) winding the first separator and the second separator onto the winding core moved away from the first position in step (B) up to a cut edge portion at which the first separator and the second separator are cut in step (C), wherein in step (C), the first separator and the further winding core are in direct contact with each other, the second separator is disposed on the first separator, and the first separator is cut while being in contact with the further winding core on an upstream side and a downstream side of a cutting position of the first separator in a moving path of the first separator.

2. The method according to claim 1, wherein,
in step (C), the first separator and the second separator are cut with the first separator and the second separator being wound on a circumferential region of 15 degrees to 180 degrees of the further winding core.

3. The method according to claim 1, wherein,
in step (C), the first separator and the second separator are pressed against the further winding core by a presser jig when the first separator and the second separator are cut.

4. The method according claim 3, wherein
the presser jig comprises a roller including a plurality of protrusions formed on an outer circumferential surface of the roller.

5. The method according to claim 1, wherein
the outer circumferential surface of the further winding core includes a groove formed along an axial direction of the further winding core corresponding to a position at which the first separator and the second separator are cut.

6. The method according to claim 1, wherein,
in step (C), the first separator and the second separator are cut by a blade moving toward the further winding core.

7. The method according to claim 1, wherein
the winding core being moved away from the first position in step (B) is disposed at a second position in step (D) and thereafter is moved to a third position being different from the first position and the second position, and
the method further includes the step of removing, at the third position, a wound stack in which the first separator, the second separator, the positive electrode plate, and the negative electrode plate are wound together, from the winding core that is moved away from the first position in step (B).

8. The method according to claim 1, further comprising the steps of:
winding a positive electrode plate and a negative electrode plate around the further winding core to produce a wound body after step (C); and then
removing the wound body produced on the further winding core from the further winding core.

9. The method according to claim 1, wherein
in step (C), a movable roller is moved to press the first separator and the second separator against the outer circumferential surface of the further winding core.

10. A method of manufacturing a battery including a wound electrode assembly, the method comprising the steps of:
(A) winding a first separator, a second separator, a positive electrode plate, and a negative electrode plate onto a winding core disposed at a first position;
(B) moving the winding core away from the first position and disposing further winding core at the first position;
(C) cutting the first separator and the second separator being wound on the winding core moved away from the first position in step (B), at a location on or near the further winding core disposed at the first position in step (B), with the first separator and the second separator being stacked and retained on an outer circumferential surface of the further winding core; and
(D) winding the first separator and the second separator onto the winding core moved away from the first position in step (B) up to a cut edge portion at which the first separator and the second separator are cut in step (C), wherein
in step (C), the first separator and the further winding core are in direct contact with each other, the second separator is disposed on the first separator, and the first separator is cut while being in contact with the further winding core on an upstream side and a downstream side of a cutting position of the first separator in a moving path of the first separator.

11. The method according to claim 10, further comprising the steps of:
winding a positive electrode plate and a negative electrode plate around the further winding core to produce a wound body after step (C); and then
removing the wound body produced on the further winding core from the further winding core.

12. The method according to claim 10, wherein
in step (C), the first separator and the second separator are cut with the first separator and the second separator being wound on a circumferential region of 15 degrees to 180 degrees of the further winding core.

* * * * *